United States Patent [19]

Terry et al.

[11] Patent Number: 5,096,764

[45] Date of Patent: Mar. 17, 1992

[54] PRINTABLE CARPET TILE AND METHOD

[75] Inventors: C. Edward Terry, Kennesaw; David S. Reece, Rome, both of Ga.; Johannes A. H. Claessen, Leusden, Netherlands

[73] Assignee: Heuga Holding bv, Scherpenzeel, Netherlands

[21] Appl. No.: 581,473

[22] Filed: Sep. 12, 1990

[51] Int. Cl.$^5$ .................. B32B 33/00; B32B 11/00
[52] U.S. Cl. .................. 428/95; 428/489; 106/273.1
[58] Field of Search .............. 428/95, 489; 106/273.1

[56] References Cited

U.S. PATENT DOCUMENTS 3,895,149 7/1975 Sheffler et al. .
4,201,812 5/1980 Blanken et al. .
4,737,221 4/1988 Bell et al. .
4,830,916 5/1989 Fukuda et al. .................. 428/489 X

FOREIGN PATENT DOCUMENTS 1257563 11/1986 Japan .................. 428/489

OTHER PUBLICATIONS

Poly bd ® Resins product information.

Primary Examiner—George F. Lesmes
Assistant Examiner—Terrel Morris
Attorney, Agent, or Firm—Richard P. Crowley

[57] ABSTRACT

A printable carpet material which carpet material comprises a fibrous face, a primary backing sheet and a backing layer comprising a bitumen backing composition containing a thermosetting amount of a hydroxyl-terminated polybutadiene-diisocyanate urethane polymer to provide a heat stable carpet material subject to a wet stream printing process without substantial carpet material edge loss or distortion. A method of preparing a carpet material which is steam printable and which method comprises applying as a backing layer to a fibrous carpet material a bitumen backing composition containing a thermosetting amount of a hydroxyl-terminated polybutadiene-diisocyanate urethane polymer which permits the carpet material so prepared to be subject to wet, steam printing processes without substantial carpet material edge loss or distortion.

8 Claims, No Drawings

PRINTABLE CARPET TILE AND METHOD

BACKGROUND OF THE INVENTION

Carpet tiles are backed typically either with a thick layer of a bitumen or a polyvinyl chloride (PVC) backing composition. Bitumen-backed carpet tiles, due to the more thermoplastic nature of the backing layer, typically must be printed in large, slab form, rather than in individual tile forms as PVC, and then cut into individual tiles. Generally, carpet tiles are printed to a desired design on the fibrous face by employing a wet printing process which includes the application of aqueous dye and thickener onto the fibrous face with color fasteners and then the steaming, for example, for 3–10 minutes, of the carpet tile at live steam temperatures of 212° F. to 220° F. to fix the dye. Bitumen-backed carpet tiles when subjected to a wet printing process and live steam temperatures tend to have the face portion, that is, the fibrous face and the primary backing sheet, slide in relationship to the thermoplastic bitumen backing layer so that the resulting carpet tile edges after a wet printing process are uneven and exposed due to the instability at the higher temperatures of the bitumen backing layer. In addition and even if the carpet tile edges are not uneven, distorted or exposed, often the carpet tile develops rounded edges and/or curled edges. Therefore, bitumen-backed carpet tiles are generally printed in a wet printing process in slab form to reduce the problems arising from live steam or elevated temperature wet printing processes.

Bitumen compositions employed as carpet tile backing compositions usually include natural or synthetic bitumen and filler materials, such as calcium carbonate particles, and also modifying agents to impart desirable flexibility and stability properties to the bitumen composition. For example, bitumen backing compositions useful as a carpet tile backing layer and containing modifying polymers are described in U.S. Pat. No. 4,201,812, issued May 6, 1980, wherein a thermoplastic, styrene-butadiene-styrene block copolymer (SBS) is added to a low asphaltene bitumen to provide a carpet backing of defined flexibility and penetration values. However, the SBS modified bitumen carpet backing composition does not provide a carpet tile which may be printed in a steam, wet printing process without the problems associated therewith.

It has been suggested that carpets be backed with thixotropic polyurethane adhesives (see for example U.S. Pat. No. 3,895,149, issued July 15, 1975 hereby incorporated by reference in its entirety); however, such polyurethane-backed carpets are not commercially available, although a hydroxyl-terminated polybutadiene reacted with a polyisocyanate has been suggested as a composition as either a laminating adhesive, a precoat adhesive or as a unitary backing to the other side of a primary backing sheet of a tufted carpet in said patent.

Liquid hydroxyl-terminated homopolymers of polybutadiene, and the use of such homopolymers in isocyanate curing reactions to produce urethane polymers are commercially available, for example, as R-45M and R-45HT (poly BD) from Atochem, Inc. of The Elf Aquitaine Group. The hydroxyl-terminated polybutadiene homopolymers have been suggested for use in preparing either one step or two step, that is prepolymer, intermediate urethane polymers, and such urethane polymers have been suggested as extenders to be used with asphalt and as modifying additions to asphalt in the construction field to provide flexibility and durability to asphalt compositions employed in road construction and gravel and soil stabilization.

It is desirable to provide an improved, printable, bitumen-backed carpet tile and a method of producing a heat stable bitumen carpet tile particularly which may be employed in a wet, steam printing process without the disadvantages of the prior art bitumen-backed carpet tiles.

SUMMARY OF THE INVENTION

The invention relates an improved, bitumen-backed carpet material and a method of preparing such heat stable, printable carpet material. In particular, the invention concerns a carpet tile having a thermosetting amount of a hydroxyl-terminated polybutadiene-polyisocyanate urethane polymer to impart thermosetting properties to the bitumen backing layer.

The invention concerns a carpet material, such as tile, of improved printability, and particularly of improved wet steam process printability, and which carpet tile comprises a fibrous face secured to a primary backing sheet and a backing layer secured to the primary backing sheet and which backing layer comprises a bitumen-type backing layer containing a modifying, that is, a thermosetting, amount of a thermoset urethane polymer in an amount sufficient to impart thermosetting properties to the backing layer. The urethane polymer comprises the reaction product of a long chain hydrocarbon having an active hydrogen reactable with a polyisocyanate, such as for example but not limited to, a hydroxyl-terminated or amino-containing, long chain diene, hydrocarbon, like a hydroxyl-terminated polybutadiene and a polyisocyanate, such as an aromatic diisocyanate. The urethane polymer bitumen composition employed as a carpet tile backing layer provides a carpet tile which is heat stable and may be subject to a wet steam printing or other process at steam temperatures without substantial edge loss or edge distortion. The method of the invention comprises applying the bitumen backing composition after mixing in the reactable components of the urethane polymer to the back of a primary backing sheet having a fibrous, tufted face to provide a carpet tile having a thermoset bitumen backing layer.

The urethane-modified bitumen backing compositions employed in the preparation of carpet material, such as carpet tiles, provide for numerous advantages, both in the properties of the carpet tile and the method of preparing such carpet tile. The addition of the heat stable modifying amounts of the urethane polymer to the bitumen backing composition provides for a thermosetting-type backing composition which is stable at high steam temperatures, and therefore, provides a carpet tile bitumen-backing composition that can withstand steam and dry cycles of the normal wet printing process without edge flow or distortion of the carpet tiles. The heat stable carpet tile may be printed either in slab or individual form without the problems associated with past bitumen-backed carpet tile manufacture.

In addition, any type of bitumen may be employed in the bitumen backing composition from a low or high penetration type bitumen to a blown or straight run type bitumen. The addition of either the isocyanate, such as for example, the aromatic diisocyanate, or the hydroxyl-terminated polybutadiene to the bitumen is easily accomplished by simple mixing of the components and are compatible and stable when mixed with the bitumen. The hydroxyl-terminated polybutadiene and the polyisocyanate employed in the reaction process are both liquids and therefore are quite easy to mix into the bitumen, thereby avoiding the need for energy-consuming, high shear type mixes, such as in the preparation of bitumen backing compositions employing the styrene-butadiene-styrene block copolymers. A faster mix cycle and the blending in of the hydroxyl-terminated polybutadiene and the liquid polyisocyanate under low shear agitation conditions is permitted thereby, reducing the cost of the mixing equipment employed. It also has been found that mixing may be accomplished at lower temperatures, since the modifying ingredients are liquids with low viscosities. Therefore, mixing of the hydroxyl-terminated polybutadiene homopolymer into the bitumen may be accomplished at temperatures typically about 60° C. to 150° C., for example, 80° C. to 120° C., rather than at about 150° C. to 190° C. as normally required with modifying additives such as the SBS copolymers.

Also importantly, the blending of the hydroxyl-terminated polybutadiene polymer and the isocyanate into the bitumen provides for a lower viscosity bitumen coating composition, for example, ranging from about 5,000 cps to 20,000 cps, rather than the 10,000 cps to 100,000 cps coating viscosity of prior art bitumen backing compositions. The lower viscosity bitumen composition of the invention provides for the further advantage in that additional particulate filler materials may then be incorporated into the bitumen backing composition if desired to a higher loading level to reduce cost without reaching a viscosity which is too high for coating purposes or the same or less filler materials used and coating is possible at lower application temperatures. For example, it has been found that the typical calcium carbonate filler, which may be heated when being admixed with the bitumen composition in an SBS copolymer system, now may be added at a 5% to 15% higher by weight filler level up to amounts of 60% to 75% by weight of the bitumen composition without reaching unacceptably high coating viscosities. Thus, the employment of a hydroxyl-terminated polybutadiene-diisocyanate urethane polymer in a bitumen backing composition to provide a thermoset bitumen backing composition provides numerous and significant advantages both to the properties of the resulting carpet tile and to the method of preparing such carpet tile.

The urethane polymer employed to prepare a thermosetting bitumen backing composition for a carpet tile comprises the polymeric reaction product of a long chain hydrocarbon, such as a hydroxyl-terminated polybutadiene, together with a polyisocyanate, such as diisocyanate, typically in stoichiometric amounts, or with either the isocyanate or hydroxyl-terminated hydrocarbon being in slight excess, for example, up to about 5%, as desired. The reaction may be carried out as a one-step reaction or in a two-step reaction, that is, wherein the prepolymer is first formed of the polyisocyanate and the hydroxyl-terminated polybutadiene and then the urethane polymer further modified, for example, by the use of other chain extenders, like the use of short chain glycols or the use of polyether or polyester polyols or amine polyols.

The bitumen backing composition can also be further modified as desired to obtain the desired flexibility and hardness by the particular selection of the bitumen, that is for example, the penetration values, or the use of different fillers and the amount of the fillers. Where shorter cure time cycles are required, an accelerator or a combination of accelerators, stabilizers, catalysts or chain extenders, such as amine compounds, for example, triethylene diamine and diethyl toluene diamine and organo-metallic compounds, for example, but not limited to: tin and lead; and fatty acids like dibutyl tin dilaurate, may be added to the polymer reaction. Typically, a blend of the selected bitumen and the hydroxyl-terminated polybutadiene and the particulate filler material, such as limestone or any accelerator or chain extender as required, is admixed with the selected polyisocyanate alone or blended with bitumen as desired prior to use with the resulting reaction product resulting in a chemically crosslinked, thermoset bitumen composition. The bitumen composition should be thermoset to at least 150° C., and typically more than 180° C. The resulting thermoset bitumen composition thereby provides a heat and moisture-resistant backing composition for carpet tile which prevents the movement of the face coat, that is, the fibrous face, the primary backing sheet and the precoat when the carpet tile is subjected to high moisture and heat conditions, such as in a wet printing process.

Any long chain hydrocarbon-type material compatible with bitumen and which contains an active hydrogen group capable with reacting a polyisocyanate may be employed in the practice of the invention, such as for example, a long chain hydrocarbon, typically homo or copolymers, for example, of $C_2$-$C_4$ diene hydrocarbons, and more particularly for example homopolymers of polybutadiene which are liquid hydroxyl-terminated homopolymers containing predominantly primary terminal hydroxyl groups of the allylic types which have high reactivity especially with aromatic diisocyanates. The hydroxyl functionality of the hydroxyl polybutadiene is typical in range of 2.2 to 2.6 and may range in molecular weight for example from about 2500 mw to 3000 mw. Hydroxyl-terminated polybutadiene polymers particularly suitable for the practice of the invention have been found to be the Poly BD ® liquid resins of Atochem, Inc., of Malvern, Pennsylvania, known as R-45 and R-45HT.

The polyisocyanate employed in the preparation of urethane polymers may comprise any isocyanate, but particularly, aromatic diisocyanates are preferred, and more particularly, toluene diisocyanate or MDI is more particularly preferred. One satisfactory urethane polymer would comprise the reaction product of an MDI and a hydroxyl-terminated polybutadiene with or without the employment of accelerators. The hydroxyl-terminated polybutadiene polymer and the MDI are both liquids and are readily mixed with the bitumen, particularly at low temperatures, that is, temperatures of 120° C. or below and do not result in an increase in bitumen viscosity. The pot life of the polyisocyanate and hydroxyl-terminated polybutadiene on mixing with the bitumen may vary. The materials should be mixed, depending upon the pot life, just prior to application to the carpet back. The mixture is applied to a carpet back in a manner for example as set forth in U.S. Pat. No. 4,373,221, issued Apr. 12, 1988.

The pot life of the reaction mixture may vary, for example, from about 5 to 20 minutes. Since both of the reactive components are liquid, the components may be readily mixed into the bitumen without the need for heavy mixing equipment and high shear mixes and at a lower temperature than normally employed in mixing into bitumen, for example, 150° C. to 160° C.

The amount of the urethane polymer to be reacted in modifying the bitumen composition to provide a bitumen backing layer may vary with sufficient ingredients employed in order to obtain thermoset properties to the bitumen backing composition. Generally, amounts of about 1.5% to 2.0% or less are unsatisfactory, while higher amounts, for example, greater than 12% or 15%, are not usually required and merely add to cost unless a very high degree of thermoset properties are desired. Typically, it has been found that amounts ranging from about 3% to 12% by weight of the bitumen composition, particularly 3% to 8%, are the preferred amounts to be employed. High performance, high quality carpet backings and much larger amounts of polybutadiene-isocyanate polymers for example, up to 60% by weight, may be useful in certain backings.

A wide variety of bitumen may be employed in preparing the bitumen backing composition of the invention. The bitumen may vary as desired in penetration characteristics as required to determine the hardness or softness of the resulting bitumen backing layer. The bitumen for example may be regular bitumen, air blown bitumen, low asphaltene bitumen, propane-deactivated bitumen or combinations thereof. Typically, the penetration value of the bitumen would range from about 30 to 60 ASTM penetration values, and more particularly, 40 to 55.

The bitumen backing composition of the invention generally includes a filler to impart stiffness, to lower the cost of the backing and to add flame resistance. Generally, any filler material may be used, such as any particulate or fibrous type filler material, and more particularly particulated calcium carbonate, which may be supplemented by silica or other additives and modifiers as generally used in bitumen backing compositions. The amount of the filler material may vary; however, typically due to the lower viscosity of the bitumen with the urethane polymer, higher amounts of filler material may be used, e.g. over 50% by weight of the bitumen composition, such as for example, over 60% and up 75% or 80% without exceeding the coating viscosity limits, e.g. 120,000 cps, of the bitumen backing composition.

The bitumen backing composition is generally applied as a molten layer to the back of the carpet or the back of the carpet is laid into a molten layer of bitumen on a belt or substrate, the carpet generally comprising a fibrous face, such as a tufted face, of a natural or synthetic fiber, and more particularly, a synthetic fiber, such as nylon, polyester, acrylics or mixtures thereof, and which fiber has been secured, such as by tufting, needle punching or other techniques, to a primary backing sheet which optionally contains on the back surface a precoat layer for example of an ethylene vinyl acetate or a carboxylated SBR-type emulsion. The bitumen backing composition is applied as a backing layer over the precoat layer for example in a thickness ranging from about 30 mils to 120 mils, for example, 50 mils to 80 mils, and optionally, if required, the bitumen backing layer may be applied as a single layer or one, two or more separate layers and may also include within the backing layer a glass fiber scrim or other stabilizing sheet material, as well as a secondary backing material, such as glass fiber scrim material or polyester or other material, on the back surface of the carpet tile. The use of lower temperature compositions, below 140° C., e.g. 120° C. to 130° C., permit the use of low cost, temperature-sensitive, secondary backing sheet materials to be used like ribbon polypropylene.

The bitumen backing composition with the urethane polymer provides for a heat and moisture resistant backing layer which has thermoset properties. Carpet tiles which have been backed with the bitumen backing composition may be employed in a steam or wet printing process, and due to the thermoset stable nature of the backing layer, the resulting carpet tiles do not exhibit edge "creep", edge roundness or edge distortions, other than where for example the fiber of the face itself is capable of distortion by the wet printing process. In a typical wet printing process, that is, water, dye and a thickener, is applied to the fibrous surface of the carpet tile, generally in slab form in the bitumen-backed carpet tiles. In order to fix and fasten the dye, the slab is treated with steam for about 4 to 8 minutes, the entire slab taken out wet and hot. The slab is later cooled and washed in water to remove excess dye and thickener, then washed and dried again before being cut into carpet tiles. However, with the bitumen backing composition of the invention, bitumen backed carpets may now be individually printed.

In summary, the thermoset bitumen-backed carpet tiles and method provide many advantages over prior art bitumen-backed carpet tiles, in that the thermoplasticity of the bitumen backing layer is reduced substantially so the tiles may be exposed to steam and subsequent washing followed by drying at temperatures ranging up 130° C. In addition, the viscosity of the filled bitumen backing system is reduced due to the liquid nature of the urethane reactants permitting coating of the backing composition at temperatures of 120° C. or less versus normally backing coating temperatures of 150° C. to 160° C. at the equivalent calcium carbonate filler levels. The thermoset bitumen backing composition permits the employment of temperature and heat-sensitive, thermoplastic type primary and secondary backings, such as ribbon polypropylene, to be used in the carpet tile in place of the higher temperature and higher cost polyester backings. It has been found that the internal adhesion employing the thermoset bitumen backing layer is substantially improved in the carpet as is adhesion to various other substrates employed, such as the backing layer, the precoat and to the intervening stabilizing layers.

While carpet tile containing the improved thermoset bitumen backing is particularly useful in connection with a wet printing process, it is recognized that the thermoset bitumen-backed carpet tile has advantage wherein even though a wet printing process is not employed, since the thermoset nature of the backing layer and the other advantages set forth permit its use in high temperature or high moisture conditions, the method of preparing the carpet tile has advantages over the prior art methods of preparing bitumen-backed carpet tiles.

The invention will be described for the purposes of illustration only in connection with certain embodiments; however, it is recognized that various modifications, changes, improvements and additions may be made to the illustrated embodiments by those persons skilled in the art, all falling within the spirit and scope of the invention.

DESCRIPTION OF THE EMBODIMENTS

Example 1

Carpet tiles having a tufted nylon face, both of loop pile and cut pile, and secured to a primary sheet and having a latex precoat backing layer were backcoated with a backing composition as follows:

TABLE I

| Ingredients | Parts by weight |
| --- | --- |
| 1) Esso bitumen (40-50 penetration) | 28.1 |
| 2) Hydroxyl-terminated poly butadiene Poly BD ® resin (R-45HT, Atochem) hydroxyl number 46.6 MW average 2800 viscosity poise @ 30° C. 50 | 6.0 |
| 3) Diphenyl methane 4,4$^1$ diisocyanate (MDI) (143L Isocyanate, Dow Chemical Co.) | 0.9 |
| 4) Calcium carbonate (filler) | 65.0 |
| | 100.0 |

The bitumen backing composition was prepared by preparing a master patch of the bitumen, the filler and the hydroxyl-terminated polybutadiene by mixing in a mixer approximately 150 pounds at a batch temperature of about 120° C. One-half of the master batch was drained into a smaller container, and a low shear laboratory mixer was employed to mix in the MDI for about 2 minutes. The MDI-containing bitumen composition was then poured into a coating applicator and a first coating layer was coated onto a secondary backing of a polyester at 120° C., followed by laying in a glass fiber tissue, followed by a second bitumen backing layer, and finally applying the carpet material onto the top surface of the second bitumen layer, and thereafter cooling and printing the carpet tiles.

The crosslinking reaction of the MDI and the hydroxyl-terminated polybutadiene was slow enough to allow easy application on the plant application equipment. Reaction time was approximately six minutes from the addition of the MDI until the viscosity increased. The reaction rate appeared to be the same at temperatures between 110° C. and 150° C. Examination of the carpet tile showed that the compound properties of the carpet tile at least equivalent to a bitumen-backed carpet tile containing modifying amounts of a SBS block copolymer as regards flexibility and adhesion. The reactive system of the urethane polymer in the bitumen backing layer required about 24 hours to reach and full cure as measured by the penetration values. The reactive system reached approximately 80% cure after cool down, penetration value 35; 90% cure after one hour, penetration value 22; 95% cure after eight hours, penetration value 14; and a full cure at 24 hours, penetration value of 10. The carpet tiles so backed were then tested in a typical wet steam printing process, and when examined showed no edge flow or expansion when printed. The printing process involves steam and wet-dry cycles, as in a typical wet printing process.

Example 2

It has been found that mixing the isocyanate with a hot bitumen does not cause a reaction to occur and the viscosity of the mixture is stable. Further, mixing isocyanate with the bitumen and the filler does not cause any reaction to occur until elevated temperatures are reached, that is, generally over 190° C., at which time a slight elevation in viscosity occurs. When the bitumen, filler and the isocyanate blend is mixed with a hydroxyl-terminated polybutadiene blend, the resulting product is the same thermoset compound as if prepared in a one-step reaction. Bitumen compositions containing the isocyanate and the hydroxyl-terminated polybutadiene were prepared as shown in Table II with the resulting viscosity as illustrated. Parts A and B may then be mixed together just prior to application to a secondary backing or onto a back surface of carpet material, for example, mixing together at a coating head preblended ingredients. The parts A and B may be fed from two separate feed tanks on a reciprocating mixing application head.

TABLE II

| Ingredients | Parts by weight | |
| --- | --- | --- |
| | A | B |
| Bitumen | 27.0 | 27.0 |
| MDI | 2.6 | — |
| Poly BD ® resin R-45HT | — | 13.4 |
| Calcium carbonate | 65.0 | 65.0 |
| | 100.0 | 100.0 |
| Viscosity at 150° C. before mixing A and B | 13,000 cps | 11,000 cps |

Example 3

Bitumen backing compositions were prepared as shown in Table III employing various amounts of the filler, content, polybutadiene and MDI.

As illustrated, the amount of the urethane polymer may vary, but typically should be above 1.5% to 2.0% in order for the resulting carpet tile to have little or no melting of the backing layer at 300° F. for 15 minutes. A test of a comparable commercial bitumen-SBS block copolymer carpet tile showed total melt of the bitumen backing layer under the same heat test conditions. As set forth in the test data, increasing the reactive polybutadiene content results in a higher strength, less heat sensitive backing with a negligible effect on hardness (penetration). Increased polybutadiene content tends to have an unpredictable effect on elasticity due to the higher content of bitumen which results in necking/plastic flow giving high extension values. Increasing filler content results in a higher strength, less heat sensitive, harder backing composition. Increasing MDI content results in a higher strength, less electric and less heat sensitive carpet backing composition. Backing compositions having low polybutadiene contents of about 1.4 to 2.7 (A, B & C) may be improved by adding additional MDI. The test data indicates that the overall preferred low cost backing composition are those of E, F, I and L with polybutadiene contents of less than about 8.0% by weight. As illustrated, the thermoset urethane bitumen backing composition provides for a thermoset, stable backing in comparison to the bitumen backing composition.

TABLE III

| % | A | B | C | D | E | F | G | H | I | J | K | L | M |
|---|---|---|---|---|---|---|---|---|---|---|---|---|---|
| A. FORMULAE | | | | | | | | | | | | | |
| Bitumen | 32.7 | 28.1 | 23.4 | 30.3 | 26.0 | 21.6 | 28.1 | 24.1 | 20.1 | 25.8 | 22.1 | 18.4 | 27.9 |
| Poly BD | 2.0 | 1.7 | 1.4 | 4.0 | 3.4 | 2.9 | 6.0 | 5.1 | 4.3 | 8.0 | 6.9 | 5.7 | 6.0 |
| MDI | 0.3 | 0.25 | 0.2 | 0.7 | 0.6 | 0.5 | 0.9 | 0.8 | 0.6 | 1.2 | 1.0 | 0.9 | 1.1 |
| Filler | 65.0 | 70.0 | 75.0 | 65.0 | 70.0 | 75.0 | 65.0 | 70.0 | 75.0 | 65.0 | 70.0 | 75.0 | 65.0 |
| B. TENSILE | | | | | | | | | | | | | |
| PSI | 4 | 4 | 8 | 7 | 8 | 12 | 9 | 12 | 16 | 11 | 15* | 21 | 12 |
| C. ELASTICITY | | | | | | | | | | | | | |
| % Extension @ Break | 32 | 12 | 11 | 14 | 10 | 10 | 28 | 16 | 7 | 15 | 10* | 6 | 13 |
| D. HARDNESS | | | | | | | | | | | | | |
| Penetration | 22 | 25 | 13 | 22 | 19 | 11 | 17 | 12 | 12 | 20 | 10* | 8 | 17 |
| E. HEAT RESISTIVITY | | | | | | | | | | | | | |
| NM = No melt | M | M | M | NM | NM | NM | NM | NM | NM | NM | NM* | NM | NM |
| SM = Slight melt | | | | | | | | | | | | | |
| M = Melt 15' @ 310 F. | | | | | | | | | | | | | |

What is claimed is:

1. A carpet material which comprises a fibrous face, a primary backing sheet and a backing layer, the backing layer secured to the primary backing layer and comprising a stable, thermoset bitumen backing composition which comprises bitumen and a modified amount of a urethane polymer sufficient to impart thermoset properties to the backing layer composition, the urethane polymer comprising a reaction product composed of a hydroxyl-terminated, long chain diene hydrocarbon and a polyisocyanate to provide a carpet material which is heat stable during a wet-steam process printing without carpet material edge loss or distortion, wherein the amount of the urethane polymer ranges from about 1.5% to 15% by weight of the bitumen backing layer composition.

2. The carpet material of claim 1 wherein the amount of the urethane polymer ranges from about 2% to 12% by weight of the bitumen backing layer composition.

3. The carpet material of claim 1 wherein the bitumen backing layer composition is thermoset up to about 180° C.

4. The carpet material of claim 1 wherein the hydroxyl-terminated diene polymer comprises a hydroxyl-terminated polybutadiene homopolymer.

5. The carpet material of claim 1 wherein the bitumen backing composition contains over about 70% by weight of a calcium carbonate filler material.

6. The carpet material of claim 1 wherein the polyisocyanate comprises an aromatic diisocyanate.

7. The carpet material of claim 6 wherein the polyisocyanate comprises a diphenyl methane 4,4[1] diisocyanate.

8. A carpet material of improved wet steam process printability, which carpet material comprises a fibrous face secured to a primary backing sheet and a backing layer secured to the primary backing sheet and which backing layer comprises a bitumen backing composition comprising a bitumen and a modifying amount of from about 2% to 12% by weight of a urethane polymer sufficient to impart thermoset properties up to about 180° C. to the backing layer composition, the urethane polymer comprising the reaction of a hydroxyl-terminated polybutadiene with MDI to provide a carpet material which when subject to wet stream printing processes at temperatures of above 100° C. to 130° C. is stable and does not develop edge loss or distortion.

* * * * *

UNITED STATES PATENT AND TRADEMARK OFFICE
CERTIFICATE OF CORRECTION

PATENT NO. : 5,096,764
DATED : March 17, 1992
INVENTOR(S) : C. Edward Terry et al It is certified that error appears in the above-indentified patent and that said Letters Patent is hereby corrected as shown below:

Claim 1, col. 9, line 47: delete "layer" and insert --sheet--.

Signed and Sealed this

Twenty-second Day of April, 1997

BRUCE LEHMAN

*Commissioner of Patents and Trademarks*

*Attest:*

*Attesting Officer*